(12) United States Patent
Everson et al.

(10) Patent No.: US 8,954,834 B1
(45) Date of Patent: Feb. 10, 2015

(54) SYSTEM FOR COMMUNICATING INFORMATION TO A MOBILE DEVICE USING PORTABLE CODE WIDGETS

(75) Inventors: John M. Everson, Leawood, KS (US); Erich J. Izdepski, Falls Church, VA (US); Todd N. Koellner, Overland Park, KS (US); Wing K. Lee, Ashburn, VA (US); Sei Y. Ng, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1314 days.

(21) Appl. No.: 12/246,494

(22) Filed: Oct. 6, 2008

(51) Int. Cl.
  *G06F 15/16* (2006.01)
  *H04M 1/725* (2006.01)
  *G06F 3/048* (2013.01)

(52) U.S. Cl.
  CPC .............. *G06F 15/16* (2013.01); *H04M 1/7253* (2013.01); *G06F 3/048* (2013.01)
  USPC ............................ 715/203; 715/201; 709/248

(58) Field of Classification Search
  CPC ............................... G06F 15/16; H04M 1/7253
  USPC ........... 455/3.06; 709/248; 715/772, 201, 203
  See application file for complete search history.

(56) References Cited

U.S. PATENT DOCUMENTS

| | | | |
|---|---|---|---|
| 7,007,098 B1 * | 2/2006 | Smyth et al. ................... | 709/233 |
| 7,344,084 B2 * | 3/2008 | DaCosta .................. | 235/472.01 |
| 7,873,974 B2 * | 1/2011 | DaCosta ......................... | 725/62 |
| 2003/0198255 A1 * | 10/2003 | Sullivan et al. ............... | 370/503 |
| 2005/0069225 A1 * | 3/2005 | Schneider et al. ............ | 382/305 |
| 2006/0123010 A1 * | 6/2006 | Landry et al. .................. | 707/10 |
| 2007/0033225 A1 * | 2/2007 | Davis ........................ | 707/104.1 |
| 2007/0093239 A1 * | 4/2007 | Camp ............................ | 455/418 |
| 2007/0124775 A1 * | 5/2007 | DaCosta ......................... | 725/62 |
| 2007/0132639 A1 * | 6/2007 | Korneluk et al. ............. | 342/464 |
| 2007/0239856 A1 * | 10/2007 | Abadir .......................... | 709/219 |
| 2008/0037674 A1 * | 2/2008 | Zurek et al. ................... | 375/262 |
| 2008/0045140 A1 * | 2/2008 | Korhonen ..................... | 455/3.06 |
| 2008/0092182 A1 * | 4/2008 | Conant ......................... | 725/109 |
| 2008/0134256 A1 * | 6/2008 | DaCosta ......................... | 725/62 |
| 2008/0155062 A1 * | 6/2008 | Rabold et al. ................. | 709/219 |
| 2008/0168391 A1 * | 7/2008 | Robbin et al. ................ | 715/810 |
| 2008/0228865 A1 * | 9/2008 | Cruzada ....................... | 709/203 |

* cited by examiner

*Primary Examiner* — William Bashore
*Assistant Examiner* — Nathan Shrewsbury

(57) ABSTRACT

A system is provided for widget to widget communication. The system includes a first device, a second device, and a communication server. The first device and/or the second device are a mobile device. The communication server provides a first widget to the first device and provides a second widget to the second device, wherein the first widget and the second widget are portable code that is installed and executed in a corresponding runtime environment without additional compilation. The first widget, when executed by the first device, communicates information that identifies content associated with the first widget and a state of the content via the first device to the communication server. The communication server communicates the information and the state to the second device. The second widget, when executed by the second device, presents at least some of the content based on the information and the state in coordination with the first widget presenting the content.

19 Claims, 5 Drawing Sheets

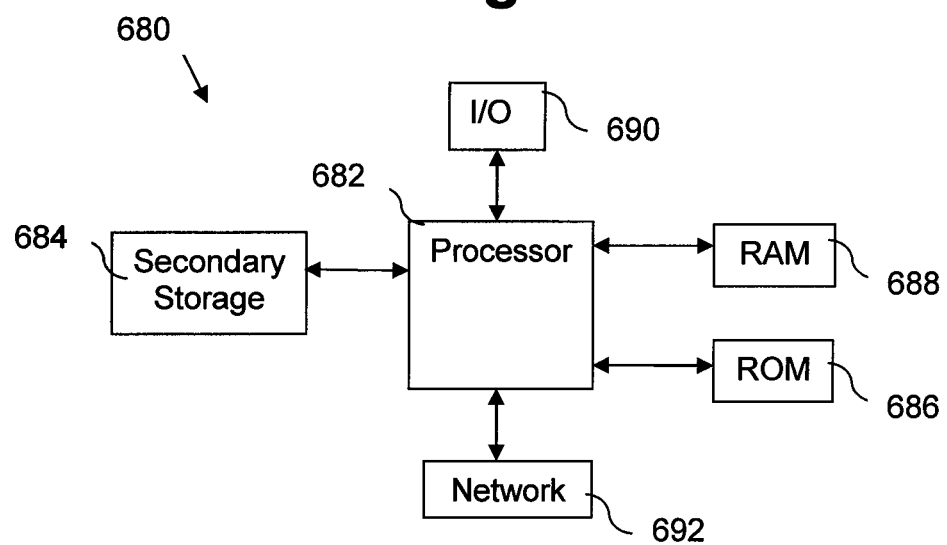

SYSTEM FOR COMMUNICATING INFORMATION TO A MOBILE DEVICE USING PORTABLE CODE WIDGETS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A widget is portable code that is installed and executed in a runtime environment without additional compilation. For example, a user may download a weather widget to their personal computer, where the weather widget may be capable of displaying a weather report whenever the personal computer is powered on. The user does not have to initiate the weather widget each time, nor does the user have to compile the weather widget for the weather widget to be operational. The user may also download another weather widget on another device, such as a mobile phone, which may display a weather report for the other device. Other types of popular widgets may display stock market reports, currency exchange reports, a slide show of user-defined photographs, the latest news headlines that include corresponding Internet links, a personal notepad, a contact list, or options to play music for Internet radio stations. Users may define preferences for their widgets, such as selecting the stocks to be displayed for the stock market reports.

SUMMARY

In some embodiments, a system is provided for widget to widget communication. The system includes a first device, a second device, and a communication server. The first device and/or the second device is a mobile device. The communication server provides a first widget to the first device and provides a second widget to the second device, wherein the first widget and the second widget are portable code that is installed and executed in a corresponding runtime environment without additional compilation. The first widget, when executed by the first device, communicates information that identifies content associated with the first widget and a state of the content via the first device to the communication server. The communication server communicates the information and the state to the second device. The second widget, when executed by the second device, presents at least some of the content based on the information and the state in coordination with the first widget presenting the content.

In other embodiments, a method is provided for widget to widget communication. A first widget is provided to a first device. A second widget is provided to a second device. Each of the first widget and the second widget is portable code that is installed and executed in a corresponding runtime environment without additional compilation. Information that identifies content associated with the first widget and a state of the content is communicated via the first device to the communication server. The information and the state are communicated from the communication server to the second device. At least some of the content is presented based on the information and the state in coordination with the first widget presenting the content.

In still other embodiments, a method is provided for widget to widget communication. A first widget is provided from a communication server to a first device. A second widget is provided from the communication server to a second device. Each of the first widget and the second widget is portable code that is installed and executed in a corresponding runtime environment without additional compilation. Information that identifies a first content associated with the first widget and a state of the first content is communicated via the first device to the communication server. The information and the state are communicated from the communication server to the second device. A second content related to the first content is presented based on the information and the state in coordination with the first widget presenting the first content.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 illustrates an exemplary general purpose computer system suitable for implementing the several embodiments of the disclosure.

DETAILED DESCRIPTION

Figure 1:
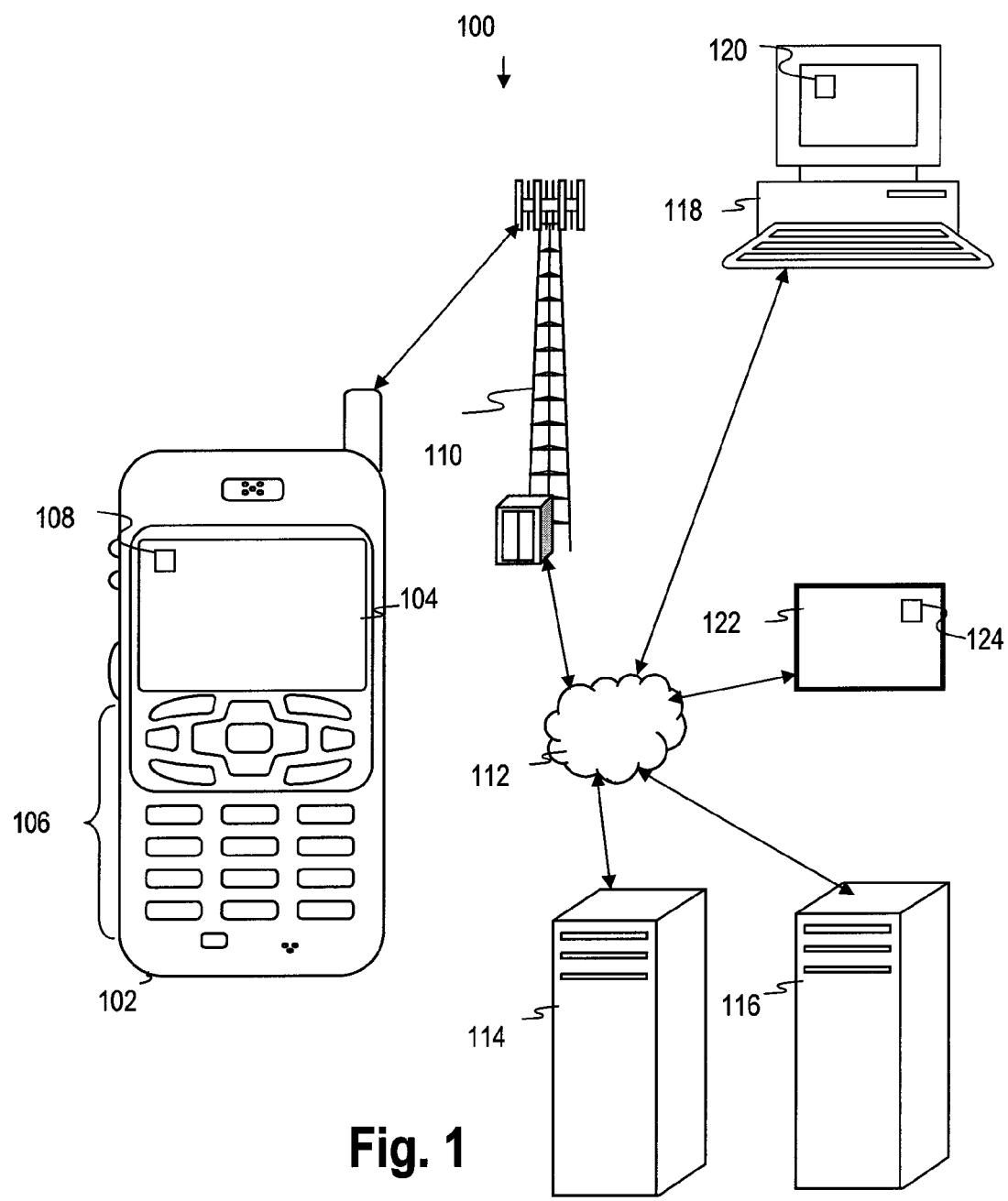
FIG. 1 shows an illustrative wireless communications system for widget to widget communication.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Although widgets may communicate with a personal computer, and with their servers or information sources, such as when a widget displays a slide show of photographs stored in a personal computer directory, widgets typically do not communicate with other widgets. The exceptions for widget to widget communication are limited to communication between widgets on the same device, such as when a slide show widget on a personal computer displays a slide show of photographs that are associated with the news headlines displayed by a news headlines widget on the same personal computer.

Embodiments of the present disclosure provide systems and methods for widget to widget communication. A communication server provides a first widget to a first device and provides a second widget to a second device. The first widget communicates information that identifies content associated with the first widget and a state of the content to the communication server. For example, the first widget communicates the name of a musical selection, the artist who performs the music, and how much of the music that the widget has already played. The communication server communicates the information and the state to the second device. The second widget may present at least some of the content based on the information and the state in coordination with the first widget presenting the content. For example, the second widget plays the same music at the same time that the first widget is playing this music, beginning at the same point in the music that the first widget is playing.

If a mobile phone user is listening to music using a widget on their mobile phone, and the mobile phone user returns home to their personal computer, the mobile phone user may listen to the rest of the music using their personal computer's superior speakers. The mobile phone user may select user preferences for the mobile phone to pause the playing of the music when the mobile phone arrives at the user's home. The user may listen to the rest of the music using their personal computer's superior speakers immediately if the personal computer is already activated, or after a delay required for activating the personal computer. Alternatively, a friend of the mobile phone user uses their own mobile phone to listen to the same music at the same time that the mobile phone user listens to this music. The widget communication results in the presentation of content that may be simultaneous, when both friends listen to the same music at the same time, consecutive, when the personal computer immediately plays the music after the mobile phone paused the playing of the music, or delayed, when the user instructs the personal computer to continue playing the music at some point after the mobile phone paused the playing of the music. The mobile phone users can use their widgets to send each other comments about the music while they are listening to the music or after they are finished listening to the music.

Alternatively, the second widget presents a different type of content that is related to the original content while the first widget is presenting the original content. For example, while the mobile phone user is using the widget on their mobile phone to listen to a specific artist's music, the widget on the same user's personal computer displays a slide show of photographs of the artist. A device user can use the widget on their device to send the same type of widget or a different type of widget to another device, such that their widget communicates with the sent widget. If the other device already has another widget stored and does not have the capacity to store both the other widget and the widget sent, the communication server can save the other widget with any user specified preferences before deleting the other widget from the storage of the other device. This enables the other device to execute the sent widget and the communication server to restore the deleted widget with the same user preferences. The widget user may specify how much or how little information their widget shares with other widgets. If a widget stops presenting content, the state of the content may be saved to enable the widget or another widget to resume presenting the content at the same point. For example, if a mobile phone is playing music when the phone enters a long tunnel and temporarily loses communication, the widget saves the point in the music when the communication was lost as a state of the content, such that the mobile phone may continue playing the music at the same point when the communication is restored.

In an embodiment, the communication server may be referred to as a widget space server. The communication server promotes widgets readily reading data from and writing data to the communication server, wherein the data is related to the widgets, for example widget states, contexts, and executables. The data may be stored in a data pool on or associated with the communication server. Widgets can search the data pool supported by the communication server without subscribing. In an embodiment, the widgets may publish and subscribe to make available and to automatically receive data. Even widgets that have no prior knowledge of each other can share data, for example through a search engine provided by the communication server. This supports a virtual mashup functionality that combines the capabilities of an unlimited number of independent widgets. However, unlike conventional mashups that are based on a single piece of software that combines multiple inputs, virtual mashups may function as independent widgets when widget communication is limited. For example, while the mobile phone user is using the widget on their mobile phone to listen to a specific artist's music, the widget on the same user's personal computer may continue to display a slide show of photographs of the artist even if the widget on the mobile phone stops communicating with the widget on the personal computer. The widget on the mobile phone and the widget on the personal computer can coordinate with each other, but they do not have to communicate with each other.

FIG. 1 shows a wireless communications system 100 that illustrates the context for the present disclosure's systems and methods. The system 100 includes a device 102. Though illustrated as a mobile phone, the device 102 may take various forms including a mobile telecommunication device, a mobile handset, a personal digital assistant (PDA), a handheld gaming device, a handheld wireless device, a pager, a digital camera, a digital music player, a digital calculator, a digital picture frame, a global positioning system (GPS) mobile device, a satellite radio, a digital video player, and a doll. In some embodiments the device 102 may take various forms including a mobile computer, a portable computer, a tablet computer, a laptop computer, a desktop computer, and an appliance. Many suitable devices 102 combine some or all of these functions.

The device 102 may include a display 104 and/or a touch-sensitive surface or keys 106 with which the user can interact. The device 102 may present options for the user to select, controls for the user to actuate, and/or cursors or other indicators for the user to direct. The device 102 may further accept data entry from the user, including numbers to dial or various parameter values for configuring the operation of the device 102. The device 102 may further execute one or more software or firmware applications in response to user commands. These applications may configure the device 102 to perform various customized functions in response to user interaction, such as a first widget 108.

In the illustrative system 100, the device 102 communicates through a base transceiver station 110 and a wired or wireless network 112 to access information on various servers, such as a communication server 114 and a content server 116. The content server 116 may store widgets for the communication server 114 to provide to devices. While one base transceiver station 110 is shown in FIG. 1, other base transceiver stations 110 could be present. The system 100 may also include a personal computer 118, which may have a second widget 120, which communicates via the network 112. Additionally, the system 100 may include a digital picture frame 122, which may have a third widget 124, which also communicates via the network 112.

Figure 2:
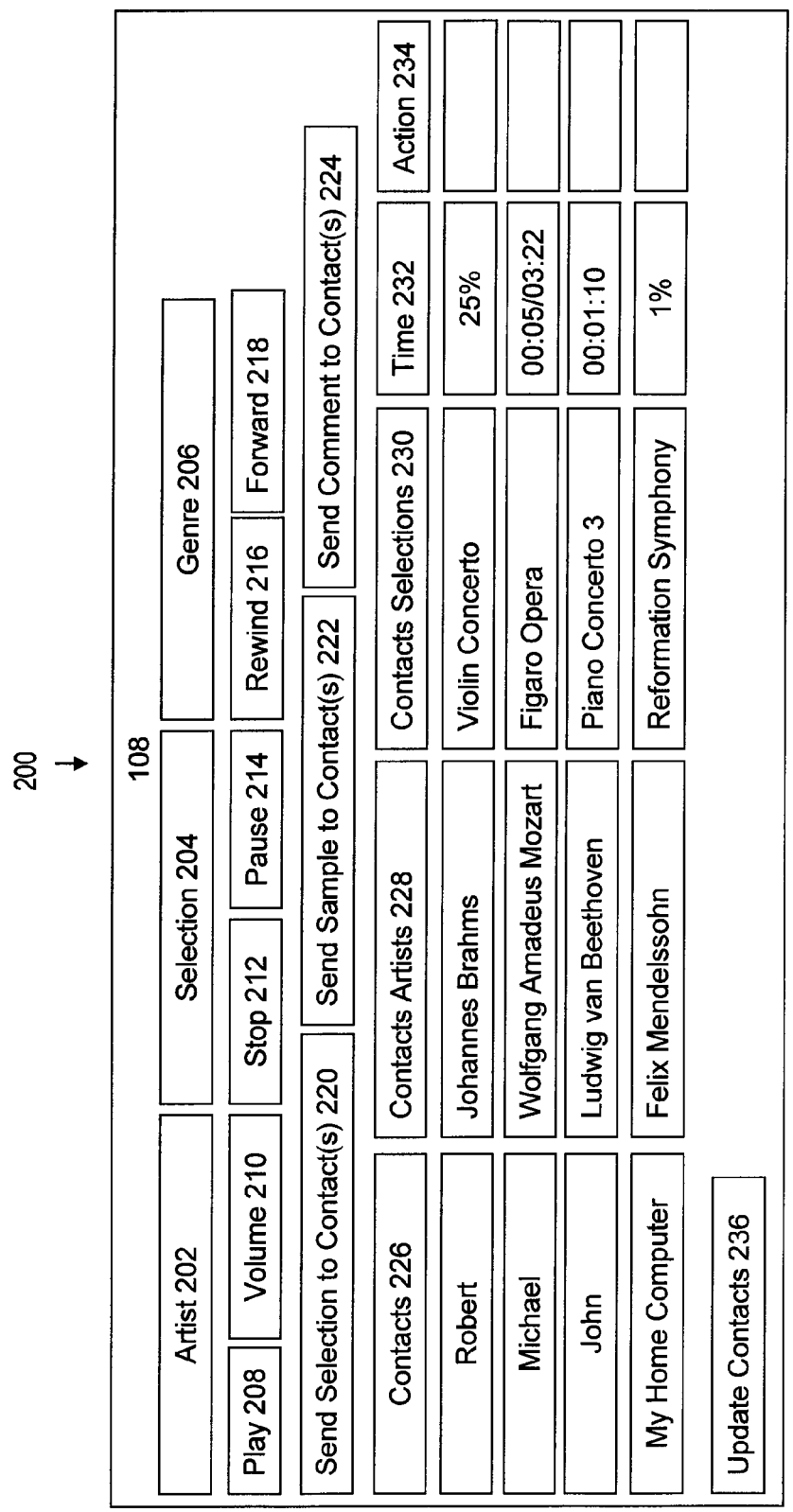
FIG. 2 shows a block diagram of a frame of a graphic user interface for widget to widget communication according to some embodiments of the present disclosure.

FIG. 2 shows a block diagram of a frame 200 of the first widget 108 for widget to widget communication according to some embodiments of the present disclosure. The frame 200 of the first widget 108 includes fields 202-206 for entering data for an Internet radio widget and fields 208-218 for controlling the Internet radio widget. For example, a user may enter a name of a musical artist into the artist field 202, a name of a musical selection into the selection field 204, or either a genre of music or Internet radio station into the genre field 206 to select music for the Internet radio widget to play. The user may select the play field 208 to play the selected music, the volume field 210 to control the volume of the selected music, the stop field 212 to stop playing the selected music, the pause field 214 to temporarily stop the selected music, the rewind field 216 to replay a portion of the selected music, and the forward field 218 to skip a portion of the selected music. The fields 202-218 are depicted for the purpose of an example, as the frame 200 may include other fields for selecting music and controlling the playing of selected music. Although the frame 200 is depicted for an Internet radio widget, the frame 200 may also depict other types of widgets.

Whereas a typical Internet radio widget may include fields similar to the fields 202-218 depicted in the frame 200, embodiments of the present disclosure also include additional fields based on widget to widget communication. For example, the frame 200 may also include a contacts column 226, a contacts artists column 228, a contacts selection column 230, a time column 232, and an action column 234. For example, the Internet radio widget for the user's device 102 communicates with the Internet radio widget for the personal computer 118, which is associated with the user's friend Robert. Based on this communication, the first row for data in the columns 226-234 indicates that the Internet radio widget for Robert's personal computer 118 is currently playing Johannes Brahm's Violin Concerto, and that 25% of this musical selection has already played. In response to viewing the frame 200 of this information, the user may select any option listed in the action column 234 based on this information. Options that the user may select include sending a sample of or the entire musical selection to a contact, requesting a sample of or the entire musical selection from a contact, and sending a recommendation, a greeting, or a dedication regarding the musical selection to a contact. The frame 200 may also include an update contacts field 236, which enables the user to add, delete, or modify the list of contacts for which the information in the columns 226-234 is displayed.

Figure 3:
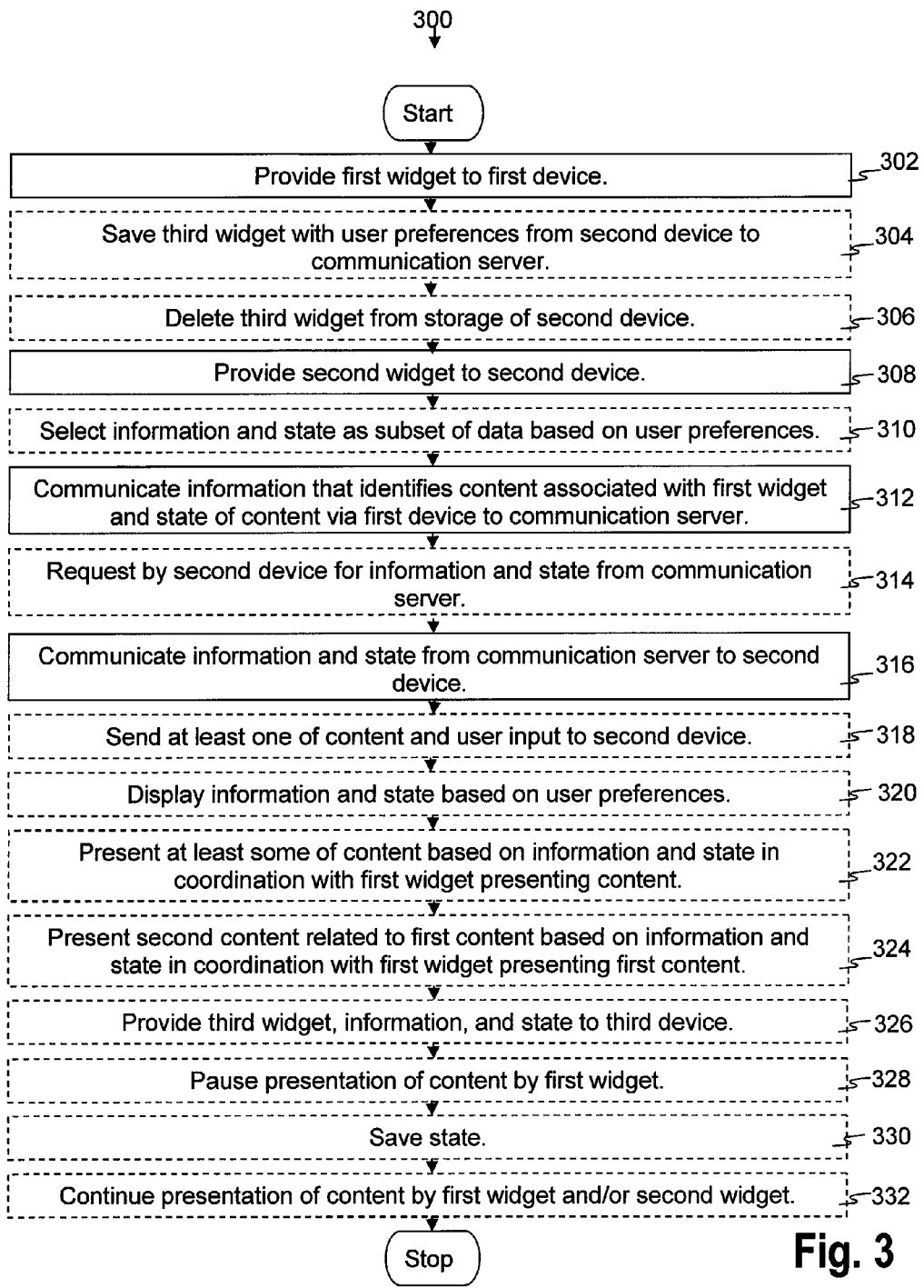
FIG. 3 shows a flowchart of a method for widget to widget communication according to some embodiments of the present disclosure.

FIG. 3 is a flowchart illustrating a method 300 for widget to widget communication according to some embodiments of the present disclosure. The method 300 can be used to coordinate the playing of content on widgets that execute on different devices.

In box 302, a first widget 108 is provided to a device 102. For example, the communication server 114 provides the first widget 108, which is an Internet radio widget, to the device 102, which is a mobile phone. The device 102 may also receive the first widget 108 from a different source, or the first widget 108 may already reside on the device 102 when the device 102 is purchased.

In box 304, the communication server 114 optionally saves a third widget 124 with user preferences from the second device. For example, the communication server 114 saves a stock market report widget with user preferences from the digital picture frame 122 because the digital picture frame 122 has limited storage capacity and cannot concurrently store both the stock market report widget and the third widget 124, which is a slide show widget, which is to be provided to the digital picture frame 122. By saving the stock market report widget with user preferences, the communication server 114 may later restore the stock market report widget with the user-defined stock selections when the digital picture frame 122 is no longer using the third widget 124.

In box 306, the third widget 124 is optionally deleted from the storage of the second device. For example, the communication server 114 deletes the stock market report widget from the storage of the digital picture frame 122 to provide sufficient storage capacity for the digital picture frame 122 to store the third widget 124 and any associated content.

In box 308, the communication server 114 provides a second widget 120 to a second device. For example, the communication server 114 provides the second widget 120, which is another Internet radio widget, to a second device, which is the personal computer 118. The personal computer 118 may also receive the second widget 120 from a different source, or the second widget 120 may already reside on the personal computer 118 when the personal computer 118 is purchased.

In box 310, information that identifies content and a state of the content is selected as a subset of data based on user preferences. The content may be an audio recording, visual images, a video recording, a multi-media recording, or a document, such as music, photographs, videos, advertising, a weather alert warning, or a public service message. The state may include an activation status of a corresponding widget, a time associated with an audio recording, a time associated with a video recording, a time associated with a multi-media recording, an image associated with a plurality of visual images, or a position within a document. The information may include a geographic location that is determined using at least one of a radio frequency identification technology, a global positioning system technology, a forward link triangulation technology, and a hybrid technology. For example, the device 102 selects the information that identifies Brahm's Violin Concerto and time already listened to Brahm's Violin Concerto, but the device 102 does not include the location of the device 102 based on user preferences for the first widget 108.

In box 312, the first widget 108 communicates information that identifies content associated with the first widget 108 and a state of the content via the first device to the communication server 114. For example, the first widget 108 communicates information that identifies Brahm's Violin Concerto and the time already listened to Brahm's Violin Concerto via the device 102 to the communication server 114. Any of the widgets 108, 120, and 124 may communicate information that identifies content associated with the corresponding widget and the state of the content to the communication server 114 based on at least one of an action and a time. For example, the first widget 108 communicates information that identifies Brahm's Violin Concerto to the communication server 114 when the user of the device 102 selects the play field 208 from the frame 200. In another example, the first widget 108 communicates information that identifies Brahm's Violin Concerto and the time already listened to Brahm's Violin Concerto to the communication server 114 on a periodic basis, such as minute-by-minute. The first widget 108 may communicate the information and the state to the communication server 114 based on a publish message from the first widget 108 on the device 102 to the communication server 114. The publish message may be based on user preferences that identify to which other widgets the first widget 108 will communicate information.

In box 314, the second device optionally requests the information and the state from the communication server 114. For example, the personal computer 118 requests the information and the state associated with the first widget 108 from the communication server 114. In this example, the personal computer 118 polls the communication server 114 for the information and the state on a periodic basis, such as polling about every ten seconds. In another embodiment, a different polling period may be employed.

In box 316, the communication server 114 communicates the information and the state to the second device. For example, the communication server 114 communicates the information that identifies Brahm's Violin Concerto and the time already listened to Brahm's Violin Concerto to the personal computer 118 based on a subscription of the personal computer 118 for the information and the state. In this example, the communication server 114 communicates the information and the state to the personal computer 118 without the personal computer 118 having to poll the communication server 114 for the information and the state. As an alternative to polling, the communication server 114 may receive a publish message from the first widget 108 and then may receive a subscribe message from the second widget 120 for the publish message. Communicating the information and the state from the communication server 114 to any of the devices 102, 118, and 122 may be based on a level of access to the information and the state specified by user preferences. For example, the communication server 114 may communicate the location of the device 102 to the personal computer 118, but not to the digital picture frame 122 when the device 102 is playing Brahm's Violin Concerto based on user preferences. The user preferences may specify that the device 102 user selected for location information to be communicated to their friend's personal computer 118 but not to their parent's digital picture frame 122.

In box 318, at least one of the content and user input are optionally sent to the second device. For example, the communication server 114 responds to a selection of one of the fields under the action column 234 in the frame 200 by sending an audio recording of Brahm's Violin Concerto and the user's highest recommendation from the device 102 to the personal computer 118. In this example, the entire audio recording is sent from one device to another device, while in other examples devices may send only a smaller sample of the content to other devices. For example, one device user may use their notepad widget to send only the current page displayed on their notepad widget to another user's notepad widget while the first device user is taking notes on the current page.

In box 320, the user interface optionally displays the information and the state based on user preferences. For example, the user interface for the personal computer 118 displays the information and the state depicted in the frame 200 based on user preferences that specify the contacts for the user of the personal computer 118. Based on the frame 200, the user of the personal computer 118 may identify which friends and relatives are currently listening to music using their own Internet radio widgets, to which artists their friends are listening, to which musical selections their friends are listening, and to how much of the musical selections their friends have already listened. For example, Robert has listened to one quarter of Brahm's Violin Concerto, Michael has listened to the first five minutes of the three hours and twenty two minutes of Mozart's Figaro Opera, and John has listened to the first minute and ten seconds of Beethoven's Third Piano Concerto.

In box 322, at least some of the content is optionally presented based on the information and the state in coordination with the first widget 108 presenting the content. For example, the second widget 120 responds to a selection on an option from the fields in the action column 234 by playing the last three-quarters of Brahm's Violin Concerto via the personal computer 118 while the first widget 108 plays the last three-quarters of Brahm's Violin Concerto via the device 102. This coordination gives the personal computer 118 user the opportunity to listen to the same music at the same time that their friend Robert listens to this music. Either or both users may select more options from the fields from the action column 234 to send comments to each other about the music to which they are both listening or have both listened.

In box 324, a second content related to the first content is optionally presented based on the information and the state in coordination with the first widget 108 presenting the first content. For example, while listening to Mozart's Figaro Opera, the mobile device user enters a room that includes the user's digital picture frame 122, which has the third widget 124. Based on user preferences, the digital picture frame 122 presents a slide show of Mozart images or Figaro Opera images while the first widget 108 plays the rest of Mozart's Figaro Opera. When the first widget 108 finishes playing Mozart's Figaro Opera, the digital picture frame 122 finishes the slide show of Mozart images or Figaro Opera images. The second content may be based on user defined content. For example, rather than using random Mozart images or Figaro Opera images downloaded from the network 112, the digital picture frame 122 accesses a file of favorite Mozart images or Figaro Opera images selected by the digital picture frame 122 user. Alternatively, the digital picture frame 122 may display concert information that indicates when the Figaro Opera will be performed locally based on the location of the device 102.

In box 326, the communication server optionally provides a third widget 124, the information, and the state to a third device. For example, while listening to Mozart's Figaro Opera, the mobile device user enters a room that includes the user's digital picture frame 122, but the digital picture frame 122 has a stock market report widget instead of the third widget 124. Based on user preferences that specify that the mobile phone user is also the digital picture frame 122 user, the user selects one of options from the fields in the action column 234 to request the communication server 114 to provide the third widget 124, the information, and the state to the digital picture frame 122. If the digital picture frame 122 has limited capacity to store both the stock market report widget and the third widget 124, the communication server 114 may save the stock market report widget with user preferences and delete the stock market report widget from the digital picture frame 122, as discussed above in boxes 304 and 306.

In box 328, the presentation of the content by the first widget 108 is optionally paused. For example, the mobile phone user selects the pause field 214 in the frame 200 to pause the playing of Brahm's Violin Concerto by the first widget 108. In another example, a temporary break in communication pauses the playing of Brahm's Violin Concerto by the first widget 108 when the device 102 passes through a long and deep tunnel.

In box 330, the state is optionally saved. For example, the communication server 114 saves the state of Brahm's Violin Concerto in response to the mobile phone user selecting the pause field 214 in the frame 200. In another example, the device 102 saves the state of Brahm's Violin Concerto in response to the temporary break in communication when the device 102 passes through the long and deep tunnel.

In box 332, the presentation of the content is optionally continued by at least one of the first widget 108 and the second widget 120. For example, the second widget 120 on the personal computer 118 continues playing Brahm's Violin Concerto at the point where the first widget 108 on the device 102 paused the playing of Brahm's Violin Concerto. In this example, the mobile phone user may have entered a room where the user's work personal computer 118 is located, and preferred to turn on the work personal computer 118 to listen to the rest of Brahm's Violin Concerto using the personal computer's superior speakers. In this example, the mobile phone user may have been listening to the music on the device 102 while driving to work where the user's work personal computer 118 is located. If the device 102 leaves work, the first widget 108 on the device 102 continues playing the music at the point where the second widget 120 on the work personal computer 118 paused the playing of the music. Upon arriving at home, second widget 120 on the user's home personal computer 118 continues playing the music at the point where the first widget 108 on the device 102 paused the playing of the music. In another example, after the device 102 has passed through the long and deep tunnel, the first widget 108 continues playing Brahm's Violin Concerto at the point where the first widget 108 paused the playing of Brahm's Violin Concerto when the device 102 temporarily broke communication.

Figure 4:
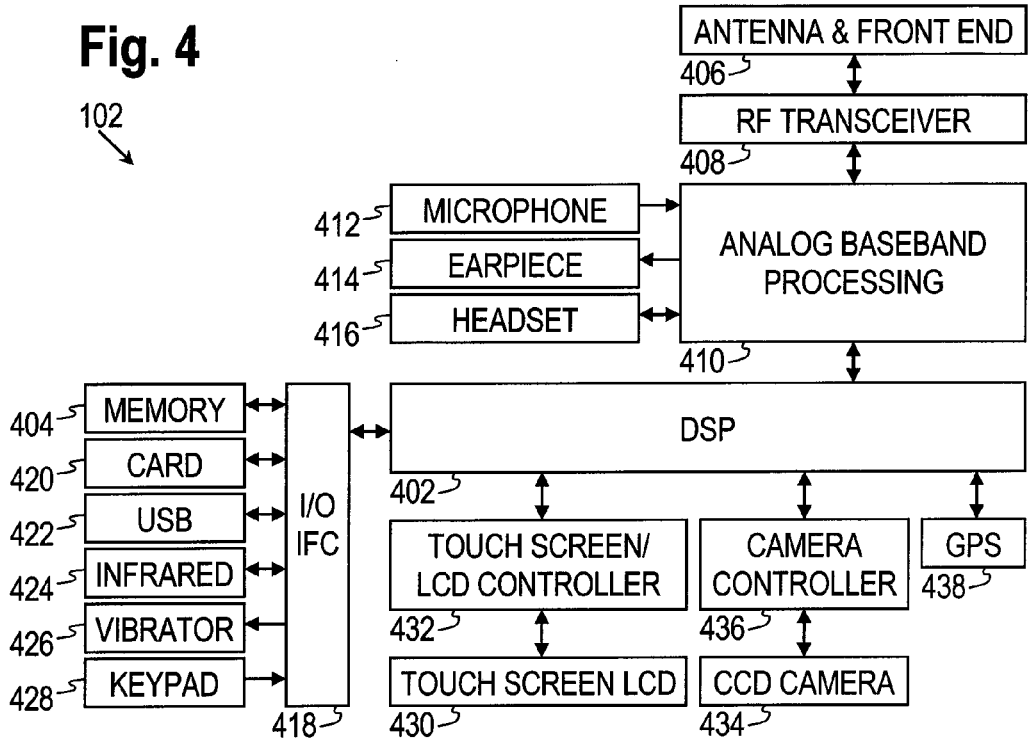
FIG. 4 shows a block diagram of an illustrative device.

FIG. 4 shows a block diagram of the device 102. The device 102 includes a digital signal processor (DSP) 402 and a memory 404. As shown, the device 102 may further include an antenna and front end unit 406, a radio frequency (RF) transceiver 408, a baseband processing unit 410, a microphone 412, an earpiece speaker 414, a headset port 416, an input/output interface 418, a memory card 420, a universal serial bus (USB) port 422, an infrared port 424, a vibrator 426, a keypad 428, a liquid crystal display (LCD) with a touch sensitive surface 430, a touch screen/LCD controller 432, a charge-coupled device (CCD) camera 434, a camera controller 436, and a global positioning system (GPS) sensor 438. Some other type of display may be substituted for the LCD with the touch sensitive surface 430.

The DSP 402 or some other form of controller or central processing unit operates to control the various components of the device 102 in accordance with embedded software or firmware stored in the memory 404. In addition to the embedded software or firmware, the DSP 402 may execute other applications stored in the memory 404 or made available via information carrier media such as portable data storage media like the memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402 to execute the methods for the heads up security display.

The antenna and front end unit 406 converts between wireless signals and electrical signals, enabling the device 102 to send and receive information from a cellular network or some other available wireless communications network or from a peer handset 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 may provide frequency shifting, e.g., converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The baseband processing unit 410 may provide channel equalization, decoding, and signal demodulation to extract information from received signals, and may code and modulate information to create transmit signals, and may provide filtering for signals. To that end, the baseband processing unit 410 includes ports for connecting to the built-in microphone 412 and the earpiece speaker 414 that enable the device 102 to be used as a cell phone. The DSP 402 can also execute the baseband processing.

The DSP 402 can send and receive digital communications with a wireless network via the baseband processing unit 410. The DSP 402 may perform modulation, demodulation, coding, decoding, interleaving, deinterleaving, spreading, despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The input/output interface 418 interconnects the DSP 402 and various memories and interfaces. The memory 404 and the removable memory card 420 may provide software and data to configure the operation of the DSP 402. The infrared port 424 and other optional ports such as a Bluetooth interface or an IEEE 802.11 compliant wireless interface enable the device 102 to communicate wirelessly with other nearby devices 102 and/or wireless base stations. In some contemplated systems, the device 102 is able to wirelessly exchange information at a point-of-sale when placed near a suitable transceiver.

The input/output interface 418 may further connect the DSP 402 to the vibrator 426 that, when triggered, causes the device 102 to vibrate. The vibrator 426 may serve as a mechanism for silently alerting the user to any of various events such as an incoming call, a new text message, and an appointment reminder.

The keypad 428 couples to the DSP 402 via the I/O interface 418 to provide one mechanism for the user to make selections, enter information, and otherwise provide input to the device 102. Another input mechanism may be the touch screen display 430, which may also display text and/or graphics to the user. The display controller 432 couples the DSP 402 to the touch screen display 430.

The CCD camera 434 enables the device 102 to take digital pictures. The DSP 402 communicates with the CCD camera 434 via the camera controller 436. The GPS sensor 438 is coupled to the DSP 402 to decode global positioning system signals, thereby providing at least one technology for the device 102 to determine its location. In another embodiment, a camera operating according to a technology other than charge coupled device cameras may be employed. Alternatively, GPS processing may be provided by a dedicated GPS chip or processor. Various other peripherals may also be included to provide additional functions, e.g., radio and television reception.

Figure 5:
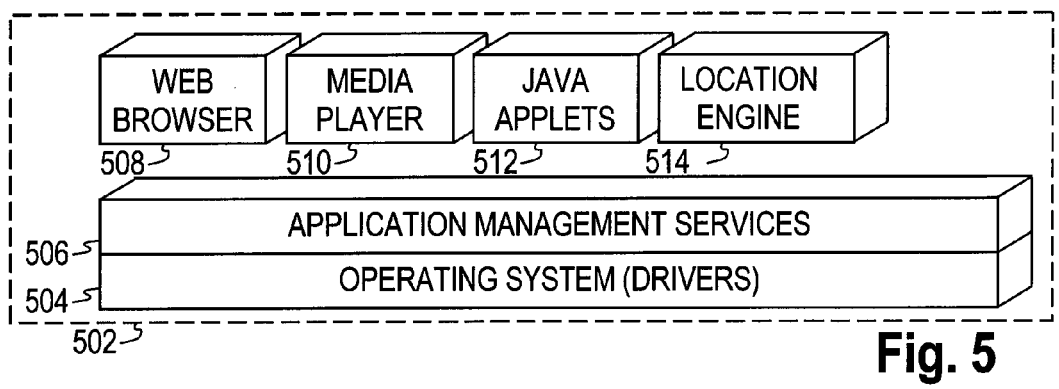
FIG. 5 shows a block diagram of an illustrative software configuration for a device.

FIG. 5 illustrates a software environment 502 that may be implemented by the DSP 402. The DSP 402 executes operating system software 504 that provides a platform from which the rest of the software operates. The operating system generally provides processing resource management support. The operating system software 504 provides drivers for the device hardware to make standardized interfaces available to application software. The operating system software 504 may transfer control between applications running on the device 102. The operating system software 504 include application management services ("AMS") 506 that transfer control between applications running on the device 102.

Also shown in FIG. 5 are a web browser application 508, a media player application 510, JAVA applets 512, and a location engine application 514. The web browser application 508 configures the device 102 to operate as a web browser, allowing the user to enter information into forms and select links to retrieve and view web pages, including content from the content server 116. The media player application 510 configures the device 102 to retrieve and play audio or audiovisual media on its own output components. The JAVA applets 512 may configure the device 102 to provide games, utilities, and other functionality on the device 102. These are further examples of content that may be provided by the content server 116. The location engine application 514 can execute a location fix technology for the device 102. The location engine application 514 can also store location information.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein, such as the communication server 114. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for widget to widget communication, comprising:
   a first device;
   a second device, wherein at least one of the first device and the second device is a mobile device;
   an information source to provide a first content to a first widget and a second content to a second widget;
   the first widget, when executed by the first device, to present the first content on the first device, to pause the presentation of the first content on the first device, and to communicate, via the first device to a communication server, information that identifies the first content associated with the first widget, a state of the first content based on the pause of the presentation of the first content, and a geographic location of the first device that is determined using at least one of a radio frequency identification technology, a global positioning system technology, a forward link triangulation technology, or a hybrid technology;
   a communication server to provide the first widget to the first device, to provide the second widget to the second device, and to communicate the information, the state, and the geographic location to the second device based on a subscription of the second device to the communication server for the information and the state, wherein each of the first widget and the second widget is portable code that is installed and executed in a corresponding runtime environment without additional compilation; and
   the geographic location of the first device, and the state of the first content, wherein a media type of the second content and a media type of the first content are different media types.

2. The system of claim 1, wherein the first device is one of an appliance, a mobile computer, a portable computer, a tablet computer, a laptop computer, or a desktop computer.

3. The system of claim 1, wherein the second device is one of a digital picture frame, a doll, a mobile telecommunication device, a mobile handset, a personal digital assistant, a handheld gaming device, a handheld wireless mobile device, a pager, a digital camera, a digital music player, a global positioning system (GPS) mobile device, a satellite radio, a digital video player, or a digital calculator.

4. The system of claim 1, wherein the media type of the first content comprises at least one of an audio recording, a visual image, a video recording, a multi-media recording, or a document file, and wherein the media type of the second content comprises at least one of an audio recording, a visual image, a video recording, a multi-media recording, or a document file.

5. The system of claim 1, wherein the state comprises at least one of an activation status of the first widget, a time associated with an audio recording, a time associated with a video recording, a time associated with a multi-media recording, an image associated with a plurality of visual images, or a position within a document.

6. The system of claim 1, wherein the first widget communicates information that identifies the first content associated with the first widget and the state of the first content to the communication server based on at least one of an action or a time.

7. The system of claim 1, wherein the second device requests the information and the state from the communication server.

8. The system of claim 1, further comprising a user interface associated with the second device that comprises at least one of a display screen or a keyboard, wherein the user interface displays the information and the state based on user preferences.

9. A computer implemented method for widget to widget communication, comprising:
   providing a first widget to a first device;
   providing a second widget to a second device, wherein each of the first widget and the second widget is portable code that is installed and executed in a corresponding runtime environment without additional compilation;
   presenting a first content provided by an information source by the first widget;
   pausing the presentation of the first content by the first widget;
   saving a state of the first content, wherein the state of the first content is associated with the first content that is paused;
   communicating information that identifies the first content associated with the first widget and the saved state of the first content via the first device to the communication server;
   communicating the information and the saved state from the communication server to the second device; and
   presenting a second content provided by the information source based on the information and the saved state by the second widget, wherein a media type of the first content and a media type of the second content are different media types.

10. The computer implemented method of claim 9, further comprising:
    saving a third widget with user preferences from the second device to the communication server; and
    deleting the third widget from a storage of the second device.

11. The computer implemented method of claim 9, further comprising sending at least one of the first content and user input to the second device.

12. The computer implemented method of claim 9, further comprising providing a third widget, the information, and the saved state to a third device.

13. The computer implemented method of claim 9, further comprising:
    receiving a publish message by the communication server from the first widget; and
    receiving a subscribe message by the communication server from the second widget, wherein the subscribe message is associated with the publish message.

14. A computer implemented method for widget to widget communication, comprising:
    providing a first widget from a communication server to a first device;
    providing a second widget from the communication server to a second device, wherein each of the first widget and the second widget is portable code that is installed and executed in a corresponding runtime environment without additional compilation, wherein the first widget and the second widget are different types of widgets, and wherein the first widget and the second widget are configured to present different types of content;

presenting a first content provided by an information source by the first widget;

pausing the presentation of the first content by the first widget;

communicating information that identifies the first content associated with the first widget and a state of the first content via the first device to the communication server based on pausing the presentation of the first content by the first widget;

communicating the information and the state from the communication server to the second device; and presenting a second content provided by the information source related to the first content based on the information and the state in coordination with the first widget presenting the first content, wherein a media type of the first content and a media type of the second content are different media types, wherein the media type of the first content comprises at least one of an audio recording, a visual image, a video recording, a multi-media recording, or a document file, and wherein the media type of the second content comprises at least one of an audio recording, a visual image, a video recording, a multi-media recording, or a document file.

15. The computer implemented method of claim 14, further comprising selecting the information and the state as a subset of data based on user preferences.

16. The computer implemented method of claim 14, wherein communicating the information and the state from the communication server to the second device is based on a level of access to the information and the state specified by user preferences.

17. The computer implemented method of claim 14, wherein the second content is based on user defined content.

18. The system of claim 1, wherein the communication server is further configured to receive a third widget with user preferences from the second device, wherein the second device is configured to delete the third widget from a storage of the second device in response to the communication server receiving the third widget, and wherein the communication server is further configured to restore the third widget to the second device upon the conclusion of the presentation of the at least some of the content by the second widget.

19. The computer implemented method of claim 9, wherein the information and the saved state are communicated from the communication server to the second device based on a subscription of the second device to the communication server for the information and the saved state.

* * * * *